(12) United States Patent
Lee

(10) Patent No.: US 8,516,519 B2
(45) Date of Patent: Aug. 20, 2013

(54) METHOD AND IMAGE DISPLAY DEVICE FOR SETTING DEFINITION

(75) Inventor: Suzin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 156 days.

(21) Appl. No.: 13/108,382

(22) Filed: May 16, 2011

(65) Prior Publication Data

US 2011/0231875 A1    Sep. 22, 2011

(30) Foreign Application Priority Data

May 17, 2010    (KR) .................. 10-2010-0045984

(51) Int. Cl.
*G06F 13/00*    (2006.01)
*G06F 3/00*    (2006.01)
*H04N 5/445*    (2011.01)

(52) U.S. Cl.
USPC ............... 725/38; 725/46; 725/52; 725/59; 725/87; 725/100; 348/558

(58) Field of Classification Search
USPC ............ 725/38, 46, 52, 59, 87, 100; 348/558
See application file for complete search history.

(56) References Cited

U.S. PATENT DOCUMENTS

| | | | |
|---|---|---|---|
| 2008/0034325 A1* | 2/2008 | Ording .......................... | 715/838 |
| 2008/0066102 A1* | 3/2008 | Abraham et al. ............... | 725/37 |
| 2008/0301749 A1* | 12/2008 | Harrar et al. .................. | 725/131 |
| 2009/0225108 A1* | 9/2009 | Shen ............................ | 345/699 |

FOREIGN PATENT DOCUMENTS

| | | |
|---|---|---|
| JP | 2004-126637 A | 4/2004 |
| JP | 2005-293398 A | 10/2005 |
| JP | 2005-295373 A | 10/2005 |

OTHER PUBLICATIONS

PCT International Search Report dated Dec. 27, 2011 issued in Application No. PCT/KR2011/003621.

* cited by examiner

*Primary Examiner* — Mulugeta Mengesha
(74) *Attorney, Agent, or Firm* — KED & Associates, LLP

(57) ABSTRACT

Provided are a method and image display device for setting a definition of an image. According to the method, contents are received and a definition selected by a user is received. A definition selection menu to display at least one definition for the contents is displayed and it is determined whether a definition that the user selects is supported by the image display device to display an image on the basis of the definition that the user selects. Then, an optimal definition is displayed on the definition selection menu to display the received contents with the optimal definition in the image display device.

26 Claims, 11 Drawing Sheets

140

METHOD AND IMAGE DISPLAY DEVICE FOR SETTING DEFINITION

CROSS-REFERENCE TO RELATED APPLICATIONS

The present application claims priority under 35 U.S.C. 119 and 35 U.S.C. 365 to Korean Patent Application No. 10-2010-0045984 filed on May 17, 2010, which is hereby incorporated by reference in its entirety.

BACKGROUND

The present disclosure relates to a method and image display device for setting a definition of an image, and more particularly, to a method and image display device for setting a definition by allowing a broadcast receiving device to select an appropriate definition to be displayed as allowing the image display device to select a definition of an inputted image by a user.

As a digital TV technology has been developed from a related art analog broadcast and commercialized, various kinds of contents services such as live broadcasting, Contents On Demand (COD), games, and news via an Internet network connected to each home in addition to related art broadcast media are provided to a user.

An example of the contents services via the Internet network includes an Internet Protocol TV (IPTV). The IPTV provides various information services, video contents, and broadcast programs to a TV set of a user via a high-speed internet network.

Recently, as a further developed network TV than the IPTV, concepts such as a broadband TV and a web TV are suggested. Unlike the related art IPTV, the broadband TV or web TV is provided with contents providers. Also, a user connects to each of the contents providers and receives diverse contents such as Video On Demand (VOD), games, and video phone services that the contents providers provide.

In such the above network TV system, a method of providing images or contents according to a definition that a user prefers in addition to providing images or contents to be received as they are is required. Furthermore, a method of selecting an appropriate definition for a device for displaying images or contents is required.

SUMMARY

Embodiments provide a definition selection menu for allowing a user to set a definition of contents information through a screen displaying thereof and an image display device providing the definition selection menu.

In one embodiment, an image display device for displaying information of contents received from a network, including: a contents receiving unit for receiving contents; a user input unit for receiving a definition selected by a user; and a controller for displaying a definition selection menu to display at least one definition for the contents and determining whether a definition that the user selects is supported by the image display device to display an image on the basis of the definition that the user selects, wherein the controller displays an optimal definition on the definition selection menu to display the received contents with the optical definition in the image display device.

In another embodiment, a definition setting method of an image display device, including: receiving contents; receiving a definition selected by a user; displaying a definition selection menu to display at least one definition for the contents; determining whether a definition that the user selects is supported by the image display device to display an image on the basis of the definition that the user selects; and displaying an optimal definition on the definition selection menu to display the received contents with the optimal definition in the image display device.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
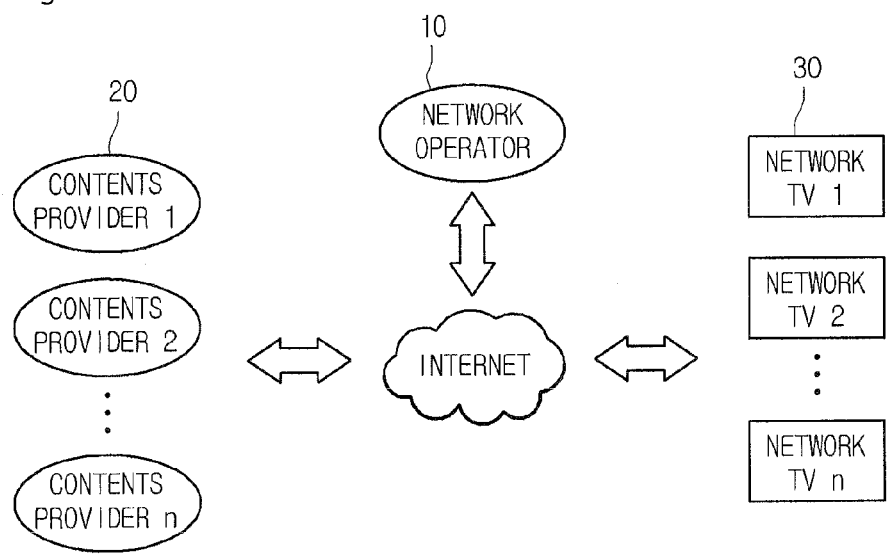
FIG. 1 is a configuration view of a network regarding an image display device and a definition setting method according to an embodiment.

FIG. 1 is a configuration view of a network regarding an image display device and a definition setting method according to an embodiment.

Referring to FIG. 1, a system of the image display device includes a network operator 10, at least one Contents Provider (CP) 20, and at least one network TV 30, which are connected via a network, for example, an internet.

The network operator 10 provides an enabling software necessary to allow the contents, provided from the CP 20 to the network TV 30, to operate normally in the network TV or a software necessary to drive the network TV 30. Furthermore, the network operator 10 provides to the CP 20 the hardware information of the network TV 30 necessary to normally execute the contents in the network TV 30. The network operator 10 and a manufacturer of the network TV 30 may be the same subject.

The CP 20 generates various contents to be provided via a network and provides the generated contents with playable formats in the network TV 30 on the request of the network TV 30. The contents may include arbitrary multimedia contents to be serviced via a network.

The network TV 30 may be equipped with a dedicated firmware for playing and searching contents for each CP 20 and displaying a list of the contents. The firmware of the network TV 30 is a program for playing or executing the contents that the CP 20 provides and varies according to kinds of the contents that the CP 20 provides. For example, if the CP 20 is a Video On Demand (VOD) provider, the firmware may be a VOD playing program and, if the CP 20 is a sound On Demand (AOD) or Music On Demand (MOD) provider, the firmware may be an AOD or MOD playing program. Additionally, if the CP 20 is a video phone provider, the firmware may be a video phone program.

The network TV 30 receives contents from the CP 20 and then plays or executes them. The network TV 30 includes a broadcast receiving device such as a TV and a settop box equipped with a network module and an arbitrary display device equipped with a network module such as a network phone. Although the network TV 30 is exemplarily used as a broadcast receiving device, embodiments may be applied to both a network-accessible display device and a display device 50 of FIG. 2 with a broadcast receiving function.

Examining more specifically, the CP 20 may create or distribute various contents to be provided to the network TV 30. The CP 20 may include TV stations, radio stations, VOD providers, AOD providers, game providers, video phone providers, weather information providers, picture related providers, Packet Filter (PF) servers, Electronic Contents Guide (ECG) providers, and portal server operators.

The network TV 30 basically includes a network interface connected to a network and receives data packets via a network to process them. If the data packets are multimedia data such as video and sound, the network TV 30 stores or plays the data packets. The network TV 30 may operate to transmit a user's requirement in a two-way communication as processing the multimedia data. Additionally, a user input unit such as a remote controller or a manipulation button to control the network TV 30 may include buttons for controlling the network TV 30, i.e., buttons for selecting various types of menus.

The network TV 30 of FIG. 1 is one example of the image display device of the present invention. The image display device will be described on the basis of the network TV 30.

Figure 2:
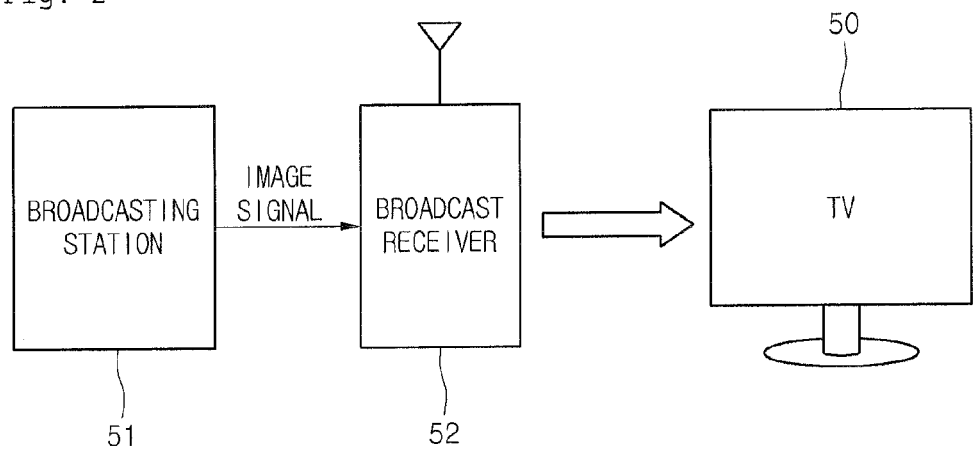
FIG. 2 is a view of a broadcast receiving device (i.e., the TV set 50) receiving and displaying an image signal from a broadcasting station 51 in real time through a broadcast receiver 52.

FIG. 2 is a view of a broadcast receiving device (i.e., the TV set 50) receiving and displaying an image signal from a broadcasting station 51 in real time through a broadcast receiver 52. The present invention is applied to the broadcast receiving device of FIG. 2.

Figure 3:
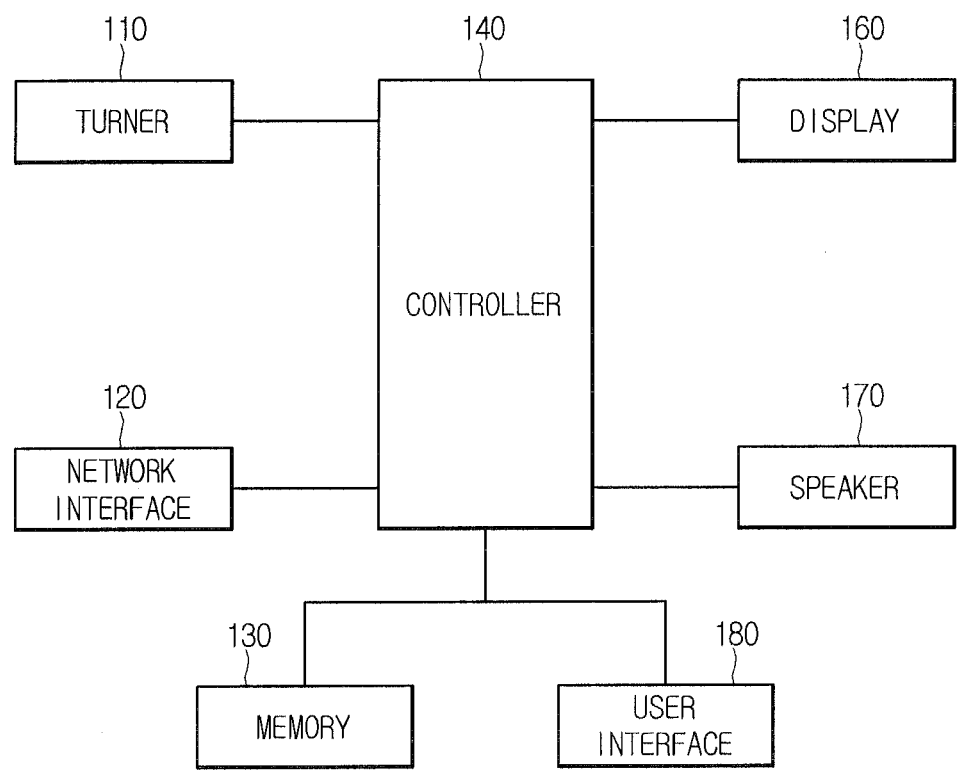
FIG. 3 is a block diagram illustrating a configuration of an image display device according to an embodiment.

FIG. 3 is a block diagram illustrating a configuration of an image display device according to an embodiment. Referring to FIG. 3, the image display device 100 may include a tuner 110, a network interface 120, a memory 130 for storing a definition selection menu related to a definition setting method according to an embodiment, a controller 140 for controlling general operations related to a definition setting method according to an embodiment, a display 160 for displaying an image, a speaker 170 for outputting sound, and a user interface 180 for receiving a selection from a user.

The tuner 110 selects a Radio Frequency (RF) broadcast signal corresponding to a channel selected by a user or all previously-stored channels among RF broadcast signals received through an antenna. Additionally, the tuner 110 converts the RF broadcast signal into an Intermediate Frequency (IF) signal, a base band image, or a sound signal.

For example, if the selected RF broadcast signal is a digital broadcast signal, it is converted into a Digital IF signal (i.e., DIF) and, if the selected RF broadcast signal is an analog broadcast signal, it is converted into an analog base band image or a sound signal (i.e., Composite Vertical Blanking Signal (CVBS)/Sound Intermediate Frequency (SIF)). That is, the tuner 110 may process both the digital broadcast signal and the analog broadcast signal. The analog base band image or sound signal (i.e., CVBS/SIF) outputted from the tuner 110 may be directly inputted to the controller 170.

Moreover, the tuner 110 may receive an RF broadcast signal of a single carrier on the basis of the Advanced Television System Committee (ATSC) or an RF broadcast signal of a plurality of carriers on the basis of the Digital Video Broadcasting (DVB).

Furthermore, the tuner 110 sequentially selects RF broadcast signals of all broadcast channels stored by a channel memory function among RF broadcast signals received through an antenna and then converts the selected RF broadcast signal into an IF signal, or a base band image or a sound signal.

The network interface 120 receives packets from a network and transmits packets to a network. That is, the network interface 120 receives services and contents from a service provider via a network.

The image display device 100 provides an interface to connect to a wire/wireless network including an internet network. The network interface 120 may include an Ethernet terminal to connect to a wired network, for example and may use communication standards such as Wireless LAN (WLAN) such as Wi-Fi, Wireless broadband (Wibro), World Interoperability for Microwave Access (Wimax), and High Speed Downlink Packet Access (HSDPA) to connect to a wireless network.

The network interface 120 may transmit or receive data to or from another user or electronic device via a connected network or another network linked to the connected network. Especially, the network interface 120 may transmit some contents data stored in the image display device 100 to a selected user or electronic device among other users or electronic devices preregistered in the image display device 100.

Meanwhile, the network interface 120 may access a predetermined web page via a connected network or another network linked to the connected network. That is, the network interface 120 may transmit or receive data to or from a corresponding server as accessing to the predetermined web page via a network. Other than that, the network interface 120 may receive contents or data that a CP or a network operator provides. That is, the network interface 120 may receive contents such as movies, advertisements, games, VOD, and broadcast signals and information thereof that CPs or network operators provide. Moreover, the network interface 120 may receive update information and update files of the firmware that a network operator provides. Furthermore, the network interface 120 may transmit data to an internet, a CP or a network operator.

Meanwhile, although the tuner 110 and the network interface 120 are included in FIG. 3, it is possible to include only one of the tuner 110 and the network interface 120.

Additionally, the contents receiving unit according to an embodiment may include at least one of the tuner 110 and the network interface 120 shown in FIG. 3. For example, the contents described in this specification may be a digital or analog RF broadcast signal received through the tuner 110 and may include all internet protocol data received through the network interface 120 (such as movies, advertisements, games, VOD, broadcast signals, applications, software, and contents and various data related thereto).

The controller 140 controls overall functions of the image display device 100. If the image display device 100 is a digital TV, the controller 140 processes a sound signal, a video signal, and a data broadcast signal to be in an output format by using the received broadcast signal from the tuner 110 and then outputs the processed signals to the display 160 or the speaker 170.

Additionally, the controller 140 displays a definition selection menu for displaying at least one definition for contents and determines whether a definition that a user selects is supported by the image display device 100 or not, in order to provide a definition setting method according to an embodiment.

Additionally, the controller 140 may control operations to display an image on the basis of a definition that a user selects. For example, if the definition that a user selects is not supported by the image display device 100, the controller may recreate a definition selection menu only displaying at least one definition supported by the image display device 100 and then may display the recreated definition selection menu. Additionally, if the definition that a user selects is supported by the image display device 100, an image may be displayed according to the selected definition.

Additionally, the controller 140 determines an optimal definition for displaying the received contents in the image display device 100 with the optimal definition and displays the optimal definition on the definition selection menu. A user may select a definition with reference to the optimal definition displayed distinguishably on the definition selection menu. Other detailed description besides the above will be described with reference to FIG. 4.

The display 160 may display an image according to a control of the controller 140 and may include various image display devices such as a Liquid Crystal Display (LCD), a Plasma Display Panel (PDP), an Electro Luminescent Display (ELD), and a Vacuum Fluorescent Display (VFD).

Moreover, the image display device 100 may have a function for receiving a broadcast signal of an RF signal format through a wireless or a cable, besides a function for receiving contents via a network.

Meanwhile, the configuration of the image display device 100 in FIG. 3 is just one embodiment and may vary within the scope of the present invention.

Figure 4:
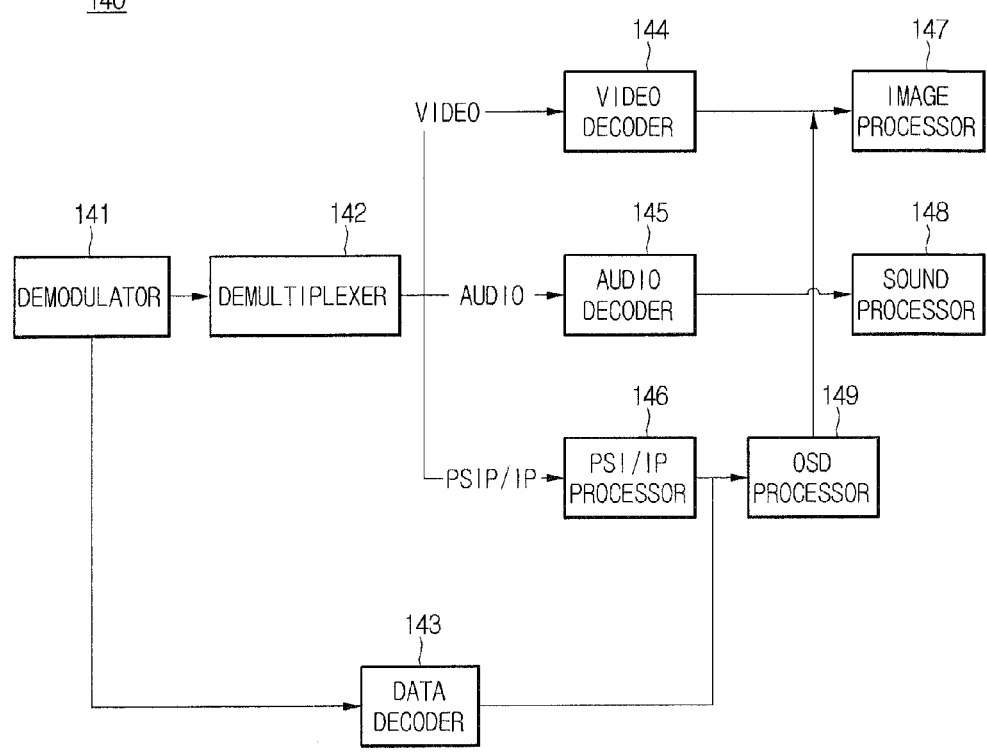
FIG. 4 is a block diagram illustrating each functional block in a controller of an image displaying device according to an embodiment.

FIG. 4 is a block diagram illustrating each functional block in a controller of an image displaying device according to an embodiment. Referring to FIG. 4, the controller 140 may include a demodulator 141, a demultiplexer 142, a video decoder 144, an audio decoder 145, a Program and System Information Protocol (PSIP)/Service Information (SI) processor 146, an image processor 147, a sound processor 148, and an On-Screen Display (OSD) processor 149.

The demodulator 141 of the image display device 100 demodulates a digital broadcast signal received through the tuner 110 of FIG. 3 and separates the demodulated signal into video and sound signals and a data broadcast signal. The demultiplexer 142 parses the video signal and the sound signal into a video signal, a sound signal, and system information (e.g., PSIP/SI). The parsed signals are respectively decoded by the video decoder 144, the audio decoder 145, and the PSIP/SI processor 146. The video signal is converted into an output signal by the image processor 147 and then is delivered to the display 160. The audio signal is converted into an output sound signal by the sound processors 145 and then is delivered to the speaker 170.

The system information is processed by the PSIP/SI processor 146 and then is converted by the OSD processor 149 into an output format of an OSD layer of the display 160. Then, the output format of the OSD layer and the decoded video signal are converted by image processor 147 into an output signal and then are delivered to the display 160.

Meanwhile, if there is a data broadcast signal among the signals received through the tuner 110, the controller 140 may further include the data decoder 143. A data broadcast signal among the signals separated by the demultiplexer 142 may be decoded on the request of a user or programs in the data broadcast signal may be executed. Thus, the data broadcast signal is converted by the OSD processor 149 into an output format of an OSD layer, is converted together with the decoded video signal by the image processor 147 into an output signal, and then is delivered to the display 160.

FIG. 4 illustrates the configuration of the controller 140 when the image display device 100 is a digital TV. Its configuration may vary when the image display device 100 is a different kind of a device such as a monitor and a kiosk.

Meanwhile, in relation to the definition setting method according to an embodiment, a definition selection menu or a definition change menu to be displayed may be displayed as an OSD or may be displayed with video data. Data for displaying the definition selection menu or the definition change menu may be generated by the controller 140 and may be outputted, or may be generated by CPs and may be displayed with contents received.

Additionally, as an optimal definition for displaying the received contents on the image display device 100 is determined, the controller 140 may determine the optimal definition through the video signal separated from the demultiplexer 142 or through data such as the system information inputted into the PSIP/SI processor 146.

For example, if the contents with the definition of 1368 *768 and a frame size of a 16:9 ratio are received, according to an image quality processing ability and a display ratio of the image display device 100, the optimal definition may vary. The controller 140 may determine an optimal definition in consideration of the received contents and performance of the image display device 100. Later, the controller 140 may display an optimal definition on the definition selection menu, being distinguished from other definitions.

Moreover, the optimal definition may be determined and displayed by the controller 140 or may be received with contents after being generated by CPs.

Meanwhile, image data for generating a definition selection menu or a definition change menu according to an embodiment are delivered to the OSD processor 149 and then are processed with an output of the video decoder 144 by the image processor 147 to be outputted. In this case, as described later, the definition selection menu is outputted as an OSD layer while a video is outputted. If the definition selection menu is outputted as a video layer, image data for generating the definition selection menu or the definition change menu are provided along with video signals to the front end of the video decoder 144.

Moreover, as shown in FIG. 4, if no decoding process is necessary since the audio data separated from the demultiplexer 142 are not compressed, they are delivered to an output terminal of the audio decoder 145 and, if a decoding process is necessary, are delivered to a front terminal of the audio decoder 145.

Figure 5:
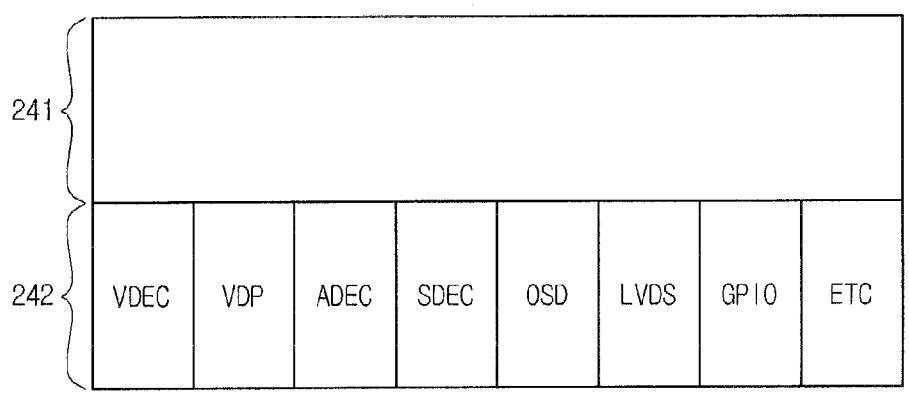
FIG. 5 is a view of an internal configuration when the image display device 100 of FIG. 3 is a digital TV and the controller 140 is a processor realized with a single System On Chip (SOC).
Figure 5:
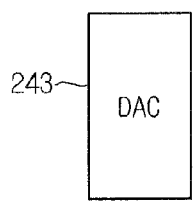

FIG. 5 is a view of an internal configuration when the image display device 100 of FIG. 3 is a digital TV and the controller 140 is a processor realized with a single System On Chip (SOC).

As shown in FIG. 5, the processor 140 of a SOC includes a chip core 241 and a function module section 242.

The chip core 241 is a section for controlling overall operations of the processor 140 and operates first when power is on to initialize the function module section 242 and its operations. The chip core 241 may include an ARM9 chip, a MIPS chip, and an ARC chip.

The function module section 242 may include function modules for controlling specific operations of the processor 140. The function modules may include a video decoding module VDEC, a video display module VDP, an audio decoding module ADEC, a system decoding module (SDEC), an OSD module OSD, a Low-voltage differential signaling (LVDS) module LVDS, and General Purpose Input Output (GPIO) module GPIO and may further include additional modules on the bases of required functions of the processor 140 besides the above modules.

When a module necessary for a function of the processor 140 is not included in the SOC or an additional module for another function is further required, modules having corresponding functions are mounted on a mother board and are connected to the SOC. For example, in order to convert an audio signal into a proper signal to be outputted through a speaker, besides the audio decoding module ADEC, a digital-to-analog converter (DAC) chip may be further required. In this case, an external chip 243 may be mounted on the board having a processor and may be connected to the processor.

The video decoding module VDEC decodes a video signal received with a compressed format such as MPEG2 and serves as the video decoder 144 of FIG. 4.

The video display module VDP converts the decoded video signal into an output format and performs a function of the image processor 147 of FIG. 4.

The audio decoding module ADEC decodes the audio signal received with a compressed format such as AC3, converts the decoded audio signal into an output format, and performs a function of the audio decoder 145 of FIG. 4.

The system decoding module SDEC parses a broadcast signal received in a Transport Stream (TS) into a video signal, an audio signal, and a data broadcast signal and performs a function of the demodulator 141, the demultiplexer 142, or the PSIP/SI processor 146 of FIG. 4.

The OSD module OSD controls a video signal output to an OSD layer as a video signal is outputted and performs a function of the OSD processor 149 of FIG. 4.

Figure 6:
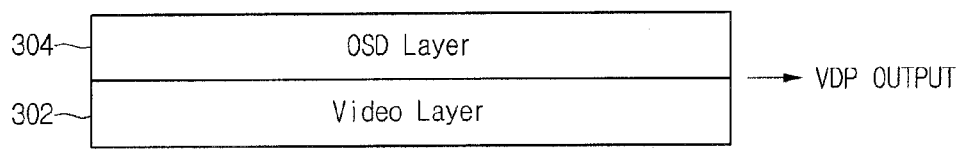
FIG. 6 is a view of two virtual layers constituting an output of the display of FIG. 3.

If the OSD layer is described in more detail, as shown in FIG. 6, an output of the display 160 includes two virtual layers. The video layer 302 is a layer where a video signal corresponding to actual contents is outputted. For example, in the case of a digital TV, a video broadcast signal or a signal corresponding to the video contents in a multimedia of a DVD player is outputted through the video layer 302. The OSD layer 304 is a layer for displaying information related to manipulations of the image display device 110 such as a menu screen, channel information, and a volume status (i.e., except for the main actual contents) during monitor setting or a layer for displaying image information related to a status of the image display device 110 to a user.

A signal outputted to the video layer 302 and a signal outputted to the OSD layer 304 may be combined to be the final one video signal and the combined video signal may be outputted by the video display module VDP.

As mentioned with reference to FIG. 6, according to which layer the definition selection menu or the definition change menu is outputted to, their position may vary.

The LVDS module LVDS effectively transmits a video signal or an audio signal to the display 160 or the speaker 170 at a fast speed.

The GPIO module GPIO delivers boot screen data to the display 160 or boot sound data to the speaker 170.

The minimum module for outputting a video among the above modules may include the video display module VDP, the OSD module OSD, the LVDS module LVDS, and the GOIP module GOIP. According to an embodiment, some module may be omitted or added and a module may be replaced with another module having the same function to obtain an additional or improved function. For example, if a video signal is compressed, the video decoding module VDEC for decoding the video signal may be required.

Additionally, the minimum module necessary for outputting sound may include the DAC module, the LVDS module, and the GPIO module. The DAC module converts an audio signal into an external output format but is not built in the processor 140 of FIG. 4, so that the external chip 243 may be used, as mentioned above. According to an embodiment, some module may be omitted or added and a module may be replaced with another module having the same function to obtain an additional or improved function. For example, if an audio signal is compressed, the audio decoding module ADEC is required.

Figure 7:
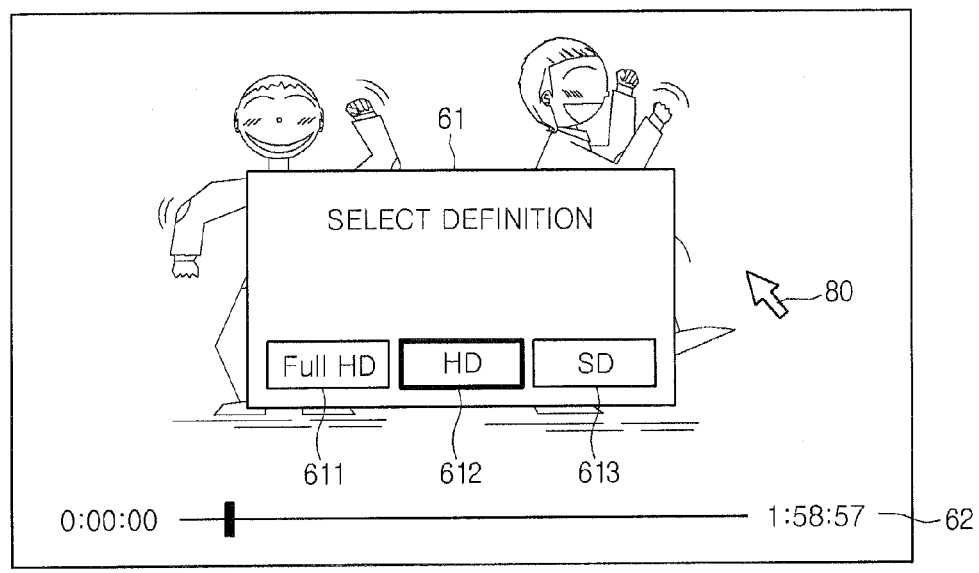
FIG. 7 is a view when a definition selection menu is displayed on an image display device according to an embodiment.

FIG. 7 is a view when a definition selection menu is displayed on an image display device according to an embodiment. Referring to FIG. 7, the definition selection menu 61 may be displayed on a screen with contents displayed, when the contents received from a network or a tuner starts to be played. As shown in FIG. 7, a movie is played back as a progressive bar 62 indicates. Referring to FIG. 7, among three definitions of a Full High Definition (HD) 611 (i.e., Ultra Definition), an HD 612 and a Standard Definition (SD) 613, a user selects the HD 612. The user selects the HD through the user interface 180 of FIG. 3. For example, a user may select a definition through an operation of touching a screen when a touch screen is used, or a mouse or a keyboard when contents are played back on a PC monitor. The user may select a corresponding definition by moving a pointer 80 on one of the Full HD 611, the HD 612, and the SD 613 through the user interface 180.

Meanwhile, as mentioned above, the controller 140 may display the most optimal definition with which the received contents are displayed on an image display device, i.e., the HD 612 is displayed being distinguished from other definitions. A user may refer to the optimal definition 612 as selecting a definition.

The contents may be received from the tuner 110 or the network interface 120 according to an embodiment. For example, the received contents may be received from the CPs 20 of the image display device 100, or from the network operator 10 of an internet TV through the network interface 120, or in real time through the broadcast receiver 52 of the TV set 50 as shown in FIG. 2. Besides that, the contents may be received from an external signal input unit 39 such as a digital VTR, a DVD player, and a game console and the images stored in a storage device 49 may be received through a contents receiving unit 55.

Moreover, after a user selects a definition, the controller 140 may display contents according to whether the definition that the user selects is supported by the image display device 100 or the CP 20 provides contents with the corresponding definition. That is, even when the definition that the user selects is an image definition supported by the CPs 20, if it is not supported by the image display device 100, the contents with the selected definition are not played or inappropriate for the image display device 100.

Figure 9:
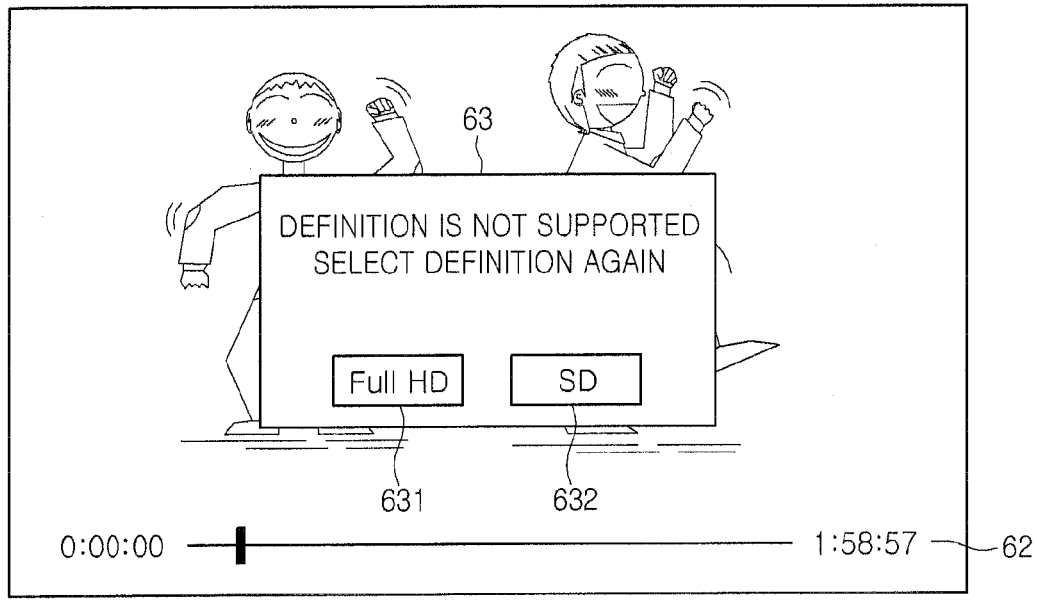
FIG. 9 is a view when a definition selection menu is displayed on an image display device according to another embodiment.

Meanwhile, if a definition that a user selects is not supported by the image display device 100, as shown in FIG. 9, a phrase "definition is not supported" is displayed as displaying other definitions that the image display device 100 supports on the definition selection menu 63. Additionally, unlike FIG. 9, without the phrase "definition is not supported", only the definition selection menu 63 may be displayed on a screen.

Figure 8:
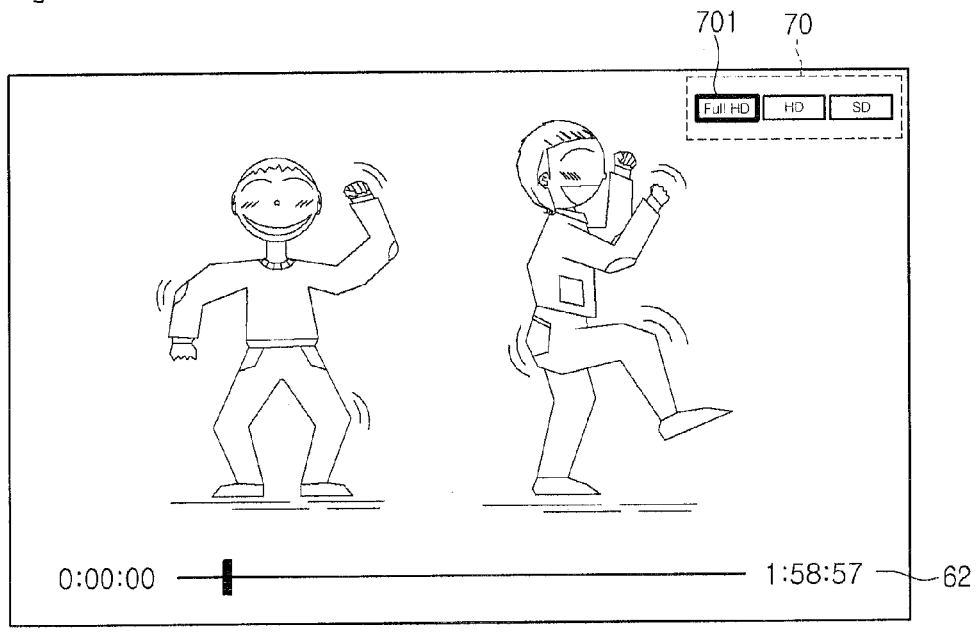
FIG. 8 is a view when contents are played back on an image display device according to an embodiment.
Figure 11:
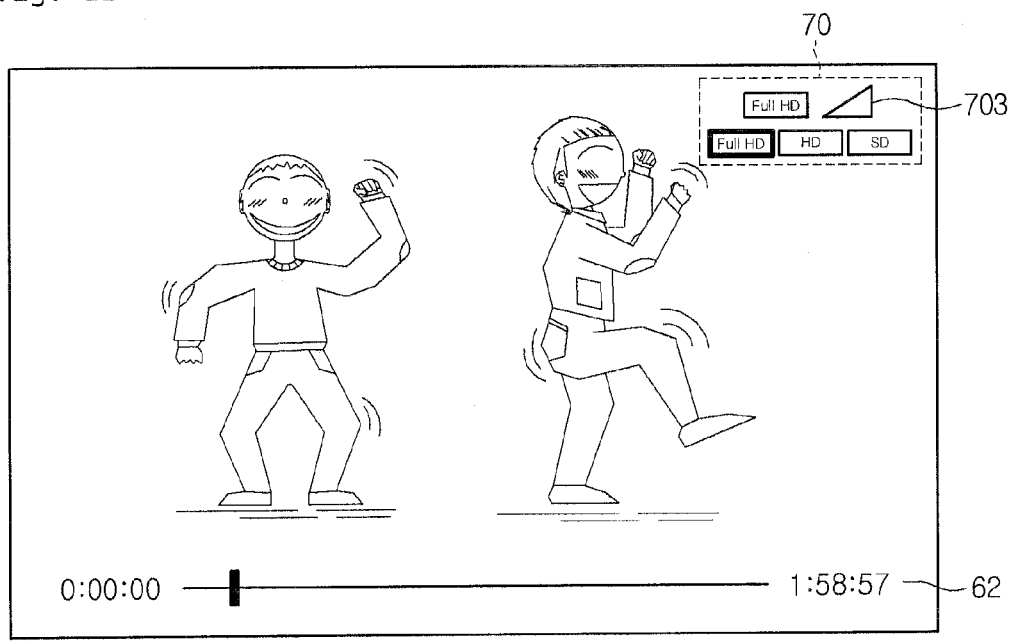
FIG. 11 is a view of a screen when contents are played back on an image display device according to another embodiment.

Moreover, if a definition that a user selects is supported by the image display device 100, contents are received and played back according to the selected definition, as shown in FIG. 8. At this point, as shown in FIG. 11, it is indicated through a sub screen 70 at upper right of a contents playing screen that the contents are played with the definition of "Full HD" 701 that the user selects among the definitions of the received contents. The sub screen 70 allows a user to easily recognize the definition of the contents displayed. The sub screen 70 may further display various information such as a title of the contents, a station channel name (if contents are received through a broadcasting station channel), and current time, in addition to the definition.

The definition selection menu 61 for receiving a definition that a user selects or a definition change menu 63 described later may be generated in an OSD format by the OSD processor 149 and then may be displayed.

The definition selection menu 61 may overlap a TV screen or a contents playback screen as shown in FIG. 7 or may be displayed at the bottom or edge of the screen. According to an embodiment, the definition selection and change menus 61 and 63 of FIGS. 7 and 9 may be displayed semi-transparently.

Additionally, it is possible to be configured to designate or change the positions or sizes of the definition selection and change menus 61 and 63 on a TV screen or a contents playback screen. For example, the Designating or changing of the definition selection menu may be accomplished using a remote controller (i.e., an example of the user interface 180) and then, the changed size of the definition selection menu 61 may be stored in the image display device 100 before a user changes the size again.

Figure 10:
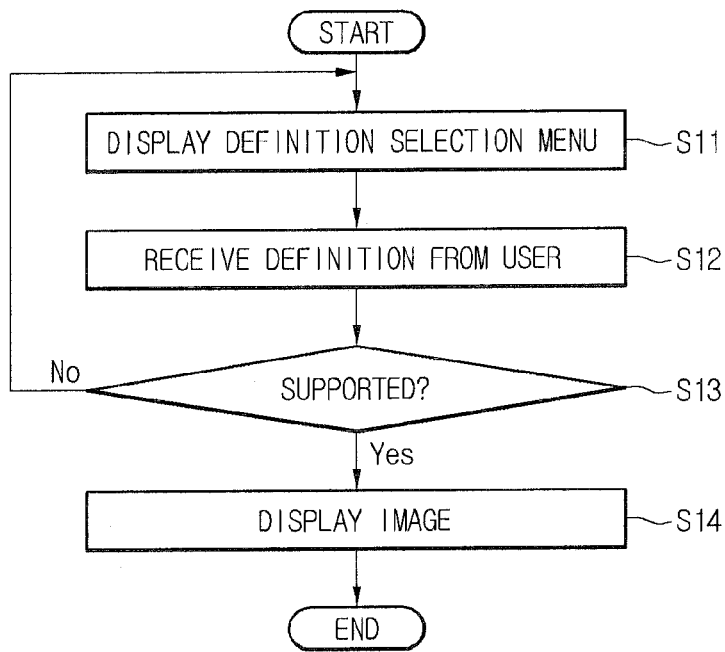
FIG. 10 is a flowchart illustrating a method of providing a definition selection menu according to an embodiment.

FIG. 10 is a flowchart illustrating a method of providing a definition selection menu according to an embodiment.

In operation S11, the definition selection menu 61 is displayed on a screen of the image display device 100 when contents start to be played back or during playback. When the TV set 50 displays contents after receiving a broadcast through the broadcast receiver 52 without receiving contents via an internet (refer to FIG. 2), the definition selection menu 61 may be displayed when the TV set 50 is turned on or a new image starts to be received. The definition selection menu 61 may be displayed by an additional input operation of a user to select a definition, i.e., by a button manipulation through the user interface 180. For example, the menu button for selecting a definition may be a button installed on a remote controller or a button positioned at the bottom of a front cover of the image display device 100. Additionally, without an additional button for selecting a definition, if a button installed at a TV remote controller or at the bottom of a front cover of the image display device 100 is used to enter a main menu, the definition selection menu 61 may be displayed after entering a sub menu of the main menu.

In operation S12, a definition that a user wants is inputted through the user interface 180. At this point, if the user does not select a definition, the definition selection menu 61 may be configured to disappear after a predetermined time. In this case, the received contents may start to be played back on the basis of a default definition or may be displayed with a definition of previous contents if the previous contents are in a playback mode.

Moreover, if the controller 140 determines an optimal definition with which the received contents are displayed on the image display device 100, even when a user does not select a definition, the received contents may be displayed with the optimal definition.

In operation S13, the image display device 100 determines whether a definition that a user select is a content definition displayable on the image display device 100 (i.e., whether the definition is provided from CPs or is supported by the image display device 100). For example, it is determined that contents having the definition that a user selects may not be provided from CPs and, even if they are provided, the image display device 100 may not support the definition. A determination result may vary according to CPs, contents types, or produced dates and may depend on specification of the image display device 100 and contents compatibility with the image display device 100. Data processing for this determination may be performed by the controller 140 of the image display device 100.

In operation S14, the image display device 100 displays an image through the display 160 according to the definition that a user selects if a definition value that the user selects is provided from the CP 20 and is supported by the image display device 100 (refer to FIG. 8).

Moreover, if the definition value that the user selects is not provided form the CP 20 or is not supported by the image display device 100, or if the controller 140 determines that the definition value is not appropriate for the image display device 100 even if the definition value is supported by the image display device 100, as shown in FIG. 9, it may provide a menu for selecting another definition in operation S11.

FIG. 11 is a view of a screen when contents are played back on an image display device according to another embodiment. The contents are played back and the signal intensity 703 of the contents in reception is indicated on the screen of the image display device 100, as shown in FIG. 11.

For example, if contents are received via an Internet, an amount of data received may vary according to an image quality of the contents and a reception intensity of the contents may vary according to a server capacity of the CP 20, an image processing ability of a broadcast receiver, a transmission speed, and internet traffic. A user may select an appropriate definition with reference to the signal intensity displayed on the sub screen 70 at top right of the screen. The signal intensity for a definition may be continuously displayed during contents playback, may pop-up only when a pointer moves on the sub screen 70, or may be displayed when the definition selection menu 61 is displayed (not shown). A user may refer to the signal intensity before or after selecting a definition. When a user refers to the signal intensity 703 in the sub screen 70 after selecting a definition, the definition may be changed through a definition change menu 63 described later (refer to FIG. 12).

FIGS. 12(a) to 12(d) are views when a definition selection menu is displayed after a preview screen for each definition is displayed. Referring to FIG. 12, after preview screens for respectively different images for at least one definition supported by the image display device 100 are sequentially played, the definition selection menu 61 is displayed.

For example, if definitions of received images supported by the image display device 100 are Full HD, HD, and SD, after sequentially displaying a preview for Full HD of FIG. 12(a), a preview for HD of FIG. 10(b), and a preview for SD of FIG. 12(c), the definition selection menu 61 may be provided as shown in FIG. 12(d). In this embodiment, after visually confirming the previews for different images displayed with respective definitions, a user selects a definition, so that comparison and selection for each definition may be easy.

Images with a definition displayable on the screen of the TV set 50 may be previews.

Additionally, according to an embodiment, the preview screens of FIGS. 12(a) to 12(c) may be received from a CP. When only an image with a definition supported by the image display device 100 is displayed, it is unnecessary to determine whether a definition that a user selects is supported by the image display device 100, so that it may be economical in an aspect of a user's operation. At this point, in the case of the TV set 50 of FIG. 2, on receiving images, the images with a definition to be displayed on the screen of the TV set 50 may be previewed.

FIGS. 13(a) to 13(d) are views when a definition selection menu is displayed after preview screens for each definition of the same image are displayed. Referring to FIGS. 13(a) to 13(d), after preview screens for each definition of the same image are displayed, the definition selection menu 61 is displayed as shown in FIG. 13(d). Except for the preview screens for the same image, this embodiment is identical to that of FIG. 12. Since a user confirms a preview screen for each definition of the same image, comparison and selection of definitions may be more accurately done.

Figure 12:
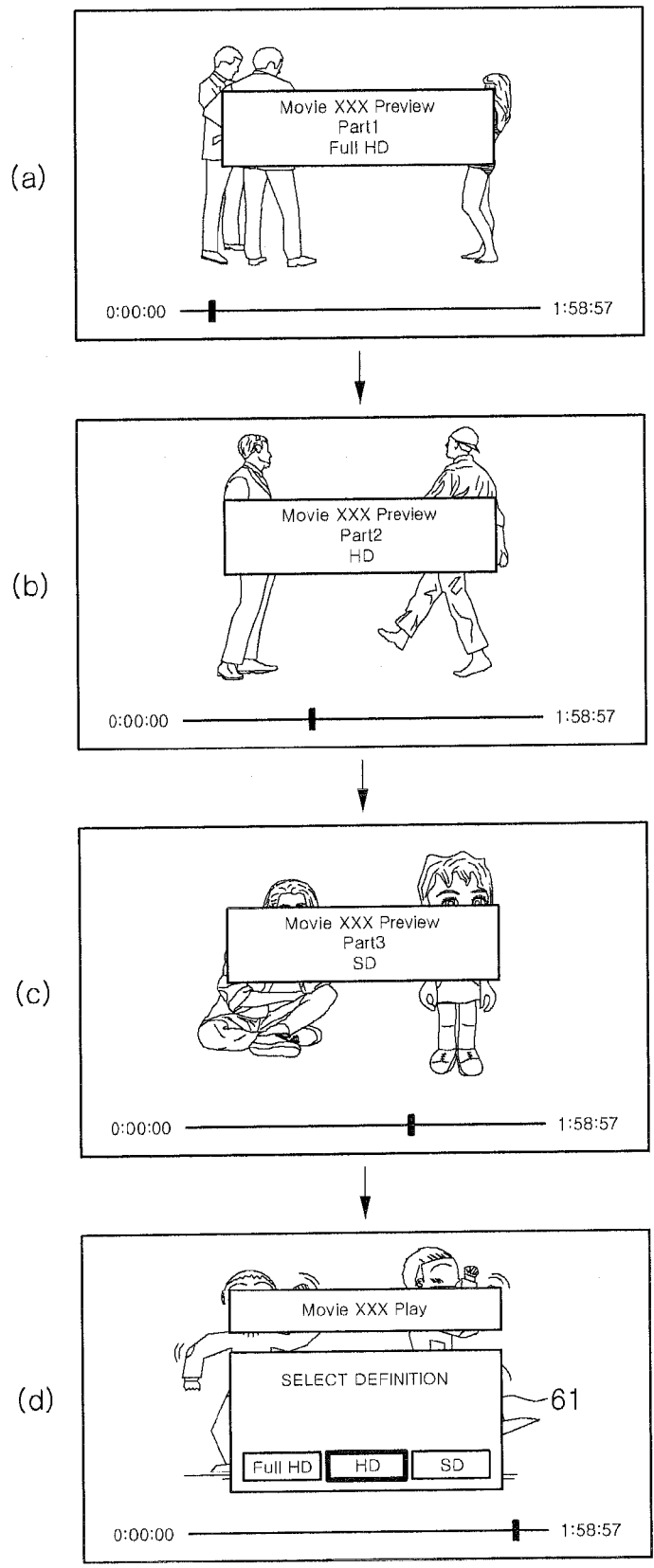
FIGS. 12(a) to 12(d) are views when a definition selection menu is displayed after a preview screen for each definition is displayed.
Figure 13:
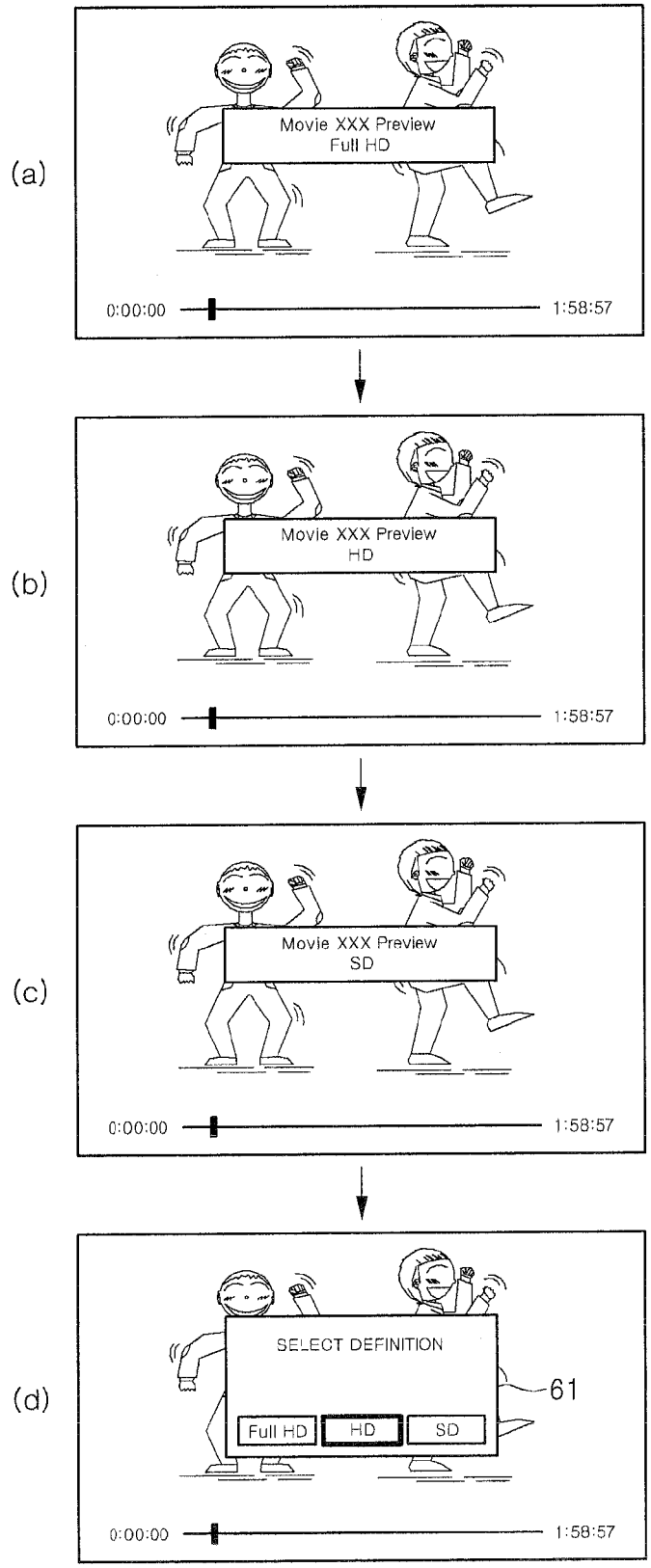
FIGS. 13(a) to 13(d) are views when a definition selection menu is displayed after preview screens for each definition of the same image are displayed.

Furthermore, the preview screens shown in FIGS. 12 and 13 may be displayed before displaying the definition selection menu 61 or the definition change menu 63. Additionally, as shown in FIGS. 13(a) to 13(d), a definition corresponding to a generated preview image may be displayed with the preview image.

Hereinafter, a method of changing a definition while contents are displayed with a definition that a user selects will be described with reference to FIGS. 14 and 15. A user may press a specific key about definition change to change a definition and the definition change menu 63 may be displayed after a predetermined time (refer to FIG. 14). The specific key for definition change may be additionally installed at a remote controller or the user interface 180, or may be accessed through a sub menu of a main menu displayed on a screen of the image display device 100. The definition change menu 63 may be useful while the contents with a definition that a user selects are played back, if a signal intensity of contents with a definition is changed due to a situation change of the CP 20 or a network, or a definition needs to be changed by a user's intention due to indoor brightness change or eye fatigue. Additionally, if the image display device itself 100 determines to change a definition, or after a predetermined time passes, the definition change menu 63 may be provided, so that more choices may be given to a user.

Figure 14:
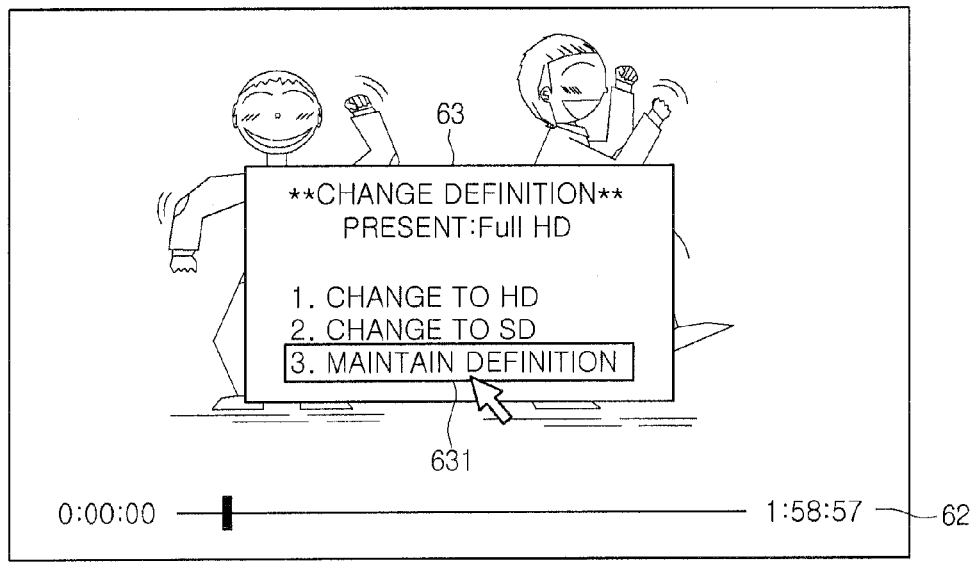
FIG. 14 is a view when a definition change menu is displayed on an image display device according to an embodiment.

If a user doesn't want to change the definition, as shown in FIG. 14, an existing definition may be maintained by selecting a phrase "3. Maintain definition". Additionally, it may be configured to play back the contents with an existing definition after a predetermined time elapses without clicking the button.

Figure 15:
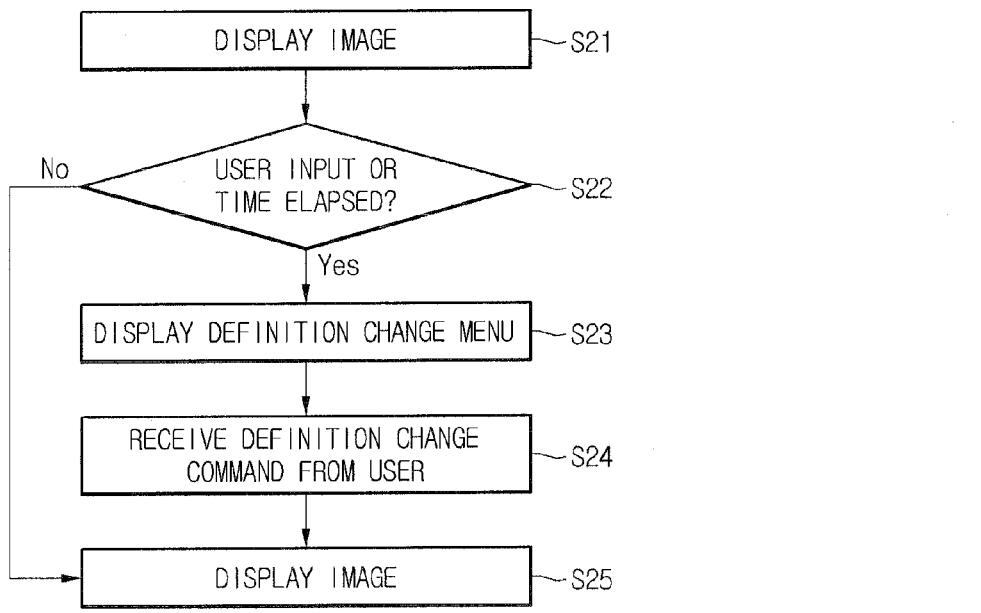
FIG. 15 is a flowchart illustrating a method of providing the definition change menu of FIG. 14.

FIG. 15 is a flowchart illustrating a method of providing the definition change menu of FIG. 14.

In operation S21, an image is displayed with a definition that a user selects.

If a user presses a specific key for changing a definition or when a predetermined time elapses in operation S22, the definition change menu 63 of FIG. 12 is displayed through the display 160 in operation S23. If there is no press of the specific key and no predetermined time elapsed, an image is displayed with an existing definition in operation S25.

In operation S24, a definition change command is received from a user. That is, a user selects one of "1. Change to HD", "2. Change to SD", and "3. Maintain definition" in the definition change menu 63.

In operation S25, an image is displayed with a definition, which is changed (or maintained) in operation S24. The definition of an image displayed in operations 21 and 25 may be changed, but if a user selects a button of "3. Maintain definition" or does not select a definition choice on the definition change menu 63 after a predetermined time elapses, the definition in operations 21 and 25 may remain being identical to an existing definition.

Figure 16:
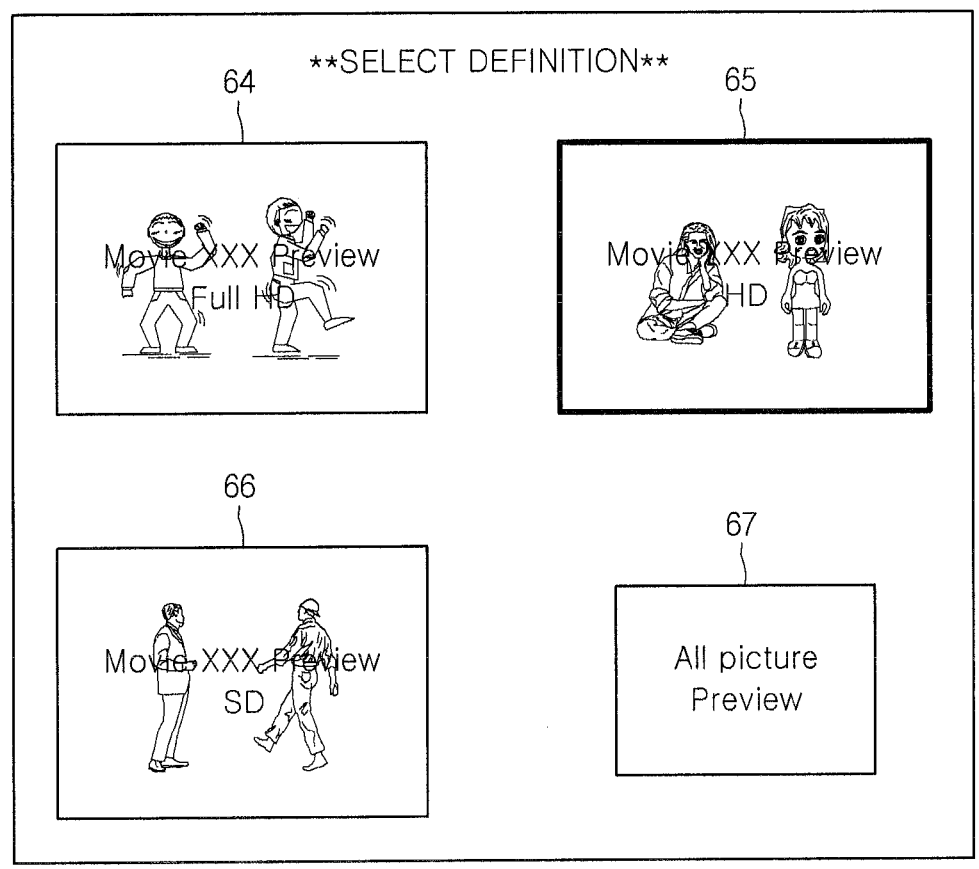
FIG. 16 is a view of a definition selection menu of an image display device and multi-windows having previews for each definition according to another embodiment.

FIG. 16 is a view of a definition selection menu of an image display device and multi-windows having previews for each definition according to another embodiment.

Unlike the previews of FIGS. 12 and 13, according to a preview screen of FIG. 16, still screens 64, 65, and 66 for preview images for each definition are displayed as multi-windows on the same screen. In this case, only when a user selects at least one of the preview images, contents of the selected preview image are played back according to each corresponding definition. As shown in FIG. 16, a user selects the preview image 65 of "HD" and its preview image is displayed for a predetermined time. Through this embodiment, a user selectively plays a preview for each definition and if a user selects a phrase "All picture Preview" 67, the previews for all definitions may be simultaneously displayed.

Meanwhile, a user may select all the previews 64, 65, and 66 and play them simultaneously without selecting the phrase "All picture Preview". The simultaneous selection of the previews 64, 65, and 66 may be accomplished through an input of a remote controller (i.e., one example of the user input unit 53). A user may select at least one of the previews 64, 65, and 66. Accordingly, a user may compare previews for each definition displayed on the same screen. The previews displayed through multi windows may be about the same image but may be for respectively different images. Additionally, the multi windows in FIG. 16 may be displayed before displaying the definition selection menu 61 or the definition change menu 63.

According to embodiments, there may be more various definitions of an image other than Full HD, HD, and SD, and the definition selection menu shown in the drawings may vary. All the embodiments are not being out of the scope of the present invention.

Moreover, the definition setting method of the present invention may be implemented with a program executed in a computer and may be stored on a computer readable recoding medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

According to the present invention, a user selects a definition of an image displayed on an image display device and it is determined whether a definition that a user selects is supported by the image display device, so that an image appropriate for user's preference and an image display device can be displayed.

According to the present invention, an image display device determines and displays received contents with an optimal definition, so that it can select a definition appropriate for the image display device.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image display device for displaying information of contents received from a network, comprising:
   a contents receiving unit for receiving contents;
   a user input unit for receiving a definition selected by a user; and
   a controller for displaying a definition selection menu to display at least one definition for the contents and determining whether a definition that the user selects is supported by the image display device to display an image on the basis of the definition that the user selects,
   wherein the controller displays an optimal definition on the definition selection menu to display the received contents with the optimal definition in the image display device,
   wherein, if the selected definition is not supported by the image display device, the controller displays a definition selection menu displaying at least one definition supported by the image display device.

2. The image display device according to claim 1, wherein the contents receiving unit receives data related to the received contents; and
   the controller displays the optimal definition on the definition selection menu on the basis of the received data.

3. The image display device according to claim 1, wherein the controller obtains a video signal from the received contents and displays the optimal definition on the definition selection menu on the basis of the obtained video signal.

4. The image display device according to claim 1, wherein the controller further comprises an image processor and generates the definition selection menu of the received contents by using the image processor to output the generated definition selection menu.

5. The image display device according to claim 1, wherein the controller further comprises an On Screen Display (OSD) processor and generates the definition selection menu of the received contents by using the OSD processor to output the generated definition selection menu.

6. The image display device according to claim 1, wherein the controller displays a signal intensity of the received contents for the at least one definition.

7. The image display device according to claim 1, wherein the controller generates a preview of the same image for at least one definition supported by the image display device.

8. The image display device according to claim 7, wherein the controller displays the generated preview of at least one image in multi windows.

9. The image display device according to claim 7, wherein the controller displays a definition corresponding to the generated preview in addition to the preview.

10. The image display device according to claim 8, wherein the controller displays a definition corresponding to the generated preview in addition to the preview image.

11. The image display device according to claim 1, wherein the controller generates previews of respectively different images for at least one definition supported by the image display device.

12. The image display device according to claim 11, wherein the controller displays a definition corresponding to the generated preview in addition to the preview.

13. The image display device according to claim 1, wherein the controller generates a definition change menu and, if a definition change command is received from a user, displays the received contents with a changed definition.

14. A definition setting method of an image display device, comprising:
    receiving contents;
    receiving a definition selected by a user;
    displaying a definition selection menu to display at least one definition for the contents;
    determining whether a definition that the user selects is supported by the image display device to display an image on the basis of the definition that the user selects; and
    displaying an optimal definition on the definition selection menu to display the received contents with the optimal definition in the image display device,
    if the selected definition is not supported by the image display device, further comprising displaying a definition selection menu displaying at least one definition supported by the image display device.

15. The method according to claim 14, further comprising:
    receiving data related to the received contents; and
    displaying the optimal definition on the definition selection menu on the basis of the received data.

16. The method according to claim 14, further comprising:
    obtaining a video signal from the received contents; and
    displaying the optimal definition on the definition selection menu on the basis of the obtained video signal.

17. The method according to claim 14, further comprising generating the definition selection menu of the received contents in addition to a video signal by using an image processor and outputting the definition selection menu.

18. The method according to claim 14, further comprising generating the definition selection menu of the received contents as an OSD by using an OSD processor and outputting the definition selection menu.

19. The method according to claim 14, further comprising displaying a signal intensity of the received contents for the at least one definition.

20. The method according to claim 14, further comprising generating a preview of the same image for at least one definition supported by the image display device.

21. The method according to claim 20, further comprising displaying the generated preview of at least one image in multi windows.

22. The method according to claim 20, further comprising displaying a definition corresponding to the generated preview in addition to the preview image.

23. The method according to claim 21, further comprising displaying a definition corresponding to the generated preview in addition to the preview image.

24. The method according to claim 14, further comprising generating previews for respectively different images for at least one definition supported by the image display device.

25. The method according to claim 24, further comprising displaying a definition corresponding to the generated preview in addition to the preview image.

26. The method according to claim 14, further comprising:
generating a definition change menu; and
if a definition change command is received from a user, displaying the received contents with a changed definition.

* * * * *